Figures 1, 2:
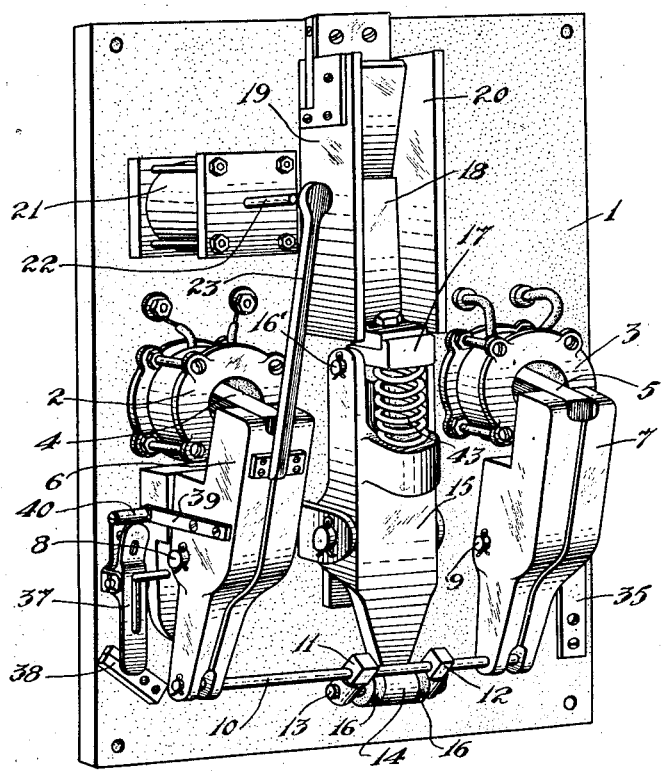

Dec. 26, 1944.   C. J. HOLSLAG   2,365,957

ELECTRICAL CIRCUIT CONTROLLER

Filed Aug. 13, 1941

INVENTOR
Claude J. Holslag
BY
A. D. T. Libby
ATTORNEY

Patented Dec. 26, 1944

2,365,957

UNITED STATES PATENT OFFICE 2,365,957

ELECTRICAL CIRCUIT CONTROLLER

Claude J. Holslag, South Orange, N. J., assignor to Electric Arc, Inc., Newark, N. J.

Application August 13, 1941, Serial No. 406,604

9 Claims. (Cl. 200—98)

This invention relates to an electrical circuit controller and has for its principal object the provision of means for forcibly acting on certain parts of the controller to insure that the controller parts will be positively actuated to open an electrical circuit which is controlled through the controller apparatus.

Another object of my invention is to provide an arrangement which I term a "knock-out" device which may be readily applied to various types of current controllers now on the market or may be readily incorporated into a new design.

By way of illustration but not of limitation, I have chosen to show my device in connection with a circuit controller such as used in the field of electric arc welding and especially in a system such as disclosed in Holslag Patent 2,277,909, issued March 31, 1942, wherein a controller is used for automatically closing a direct current circuit through a pair of welding electrodes, and then after the arc is started substituting a source of alternating current for the welding operations in place of the direct current.

My improved type of controller apparatus is illustrated somewhat diagrammatically and perspectively in Figure 1 of the drawing attached hereto, while Figure 2 shows the application of my improvement to a circuit controller used in an arc welding circuit.

In the drawing the circuit controller apparatus includes a base 1 of suitable insulating material, such as slate, on which are mounted a starting coil 2 and a series or holding coil 3. These coils are in the form of solenoids having movable magnetic core members 4 and 5 respectively. The core member 4 is carried by a movable arm 6, while the core member 5 is carried by a movable arm 7, both arms being of magnetic material pivoted at 8 and 9 respectively to parts of the coil structures. The arms 6 and 7 are connected together by a metallic rod 10 which carries devices 11 and 12 which in turn support a bolt 13 passing through the end 14 of a contact arm 15, but insulated therefrom by end insulators 16 and a tubular insulator around the bolt 13 but which does not show.

In the upper end of the arm 15 is pivoted, by the pin 16', a contact shoe 17 having a contact portion 18 adapted to engage a stationary, hidden contact 42 (see Figure 2) spaced between the barriers 19 and 20 of suitable insulating material such as Transite Board.

This part of the controller so far described is old and has only been briefly described merely for the purpose of better understanding my improvement thereto which comprises the addition of an electro-magnet coil 21 having a solenoid type of plunger 22 that is adapted to engage an extension 23 fastened in any satisfactory manner to the arm 6 of the coil 2. The function of the coil 21 and arm extension 23 will be clear from a description of the circuit shown in Figure 2, wherein 24 is a feed transformer having three phases a, b and c, star-connected, from which supply leads extend to various welding stations, only one phase being shown connected up. These connections comprise the leads 25 and 26 across which station welders are connected, one station 27 being enclosed in broken lines, while the stations 28 and 29 are only generally indicated.

Connected across the phase a is a small AC motor generator set consisting of an AC single-phase motor 30 and a DC generator 31 having a shunt field 32 and rheostat 33. A welding transformer T is indicated at the station 27 and comprises a primary winding P and main secondary M and auxiliary secondary S with normalizing windings N such as shown in Holslag Patent 1,305,363, the main and auxiliary secondary windings M and S being provided with taps.

The auxiliary secondary S is connected by a wire or cable 34 to the arm 15 and contact 18 which is connected to one side of the coil 21. The other end of the coil 21 is connected to a contact 35 which is mounted on the base 1 but is partly hidden by the arm 7. A cooperating contact 36 is actuated by the arm 7, although as shown diagrammatically, is operated by the rod 10. Another pair of contacts 37 and 38 are mounted on the base 1 and are actuated by the arm 6 through the medium of a lever 39 carrying an insulator 40. A similar arm 39 and insulator 40 are used in connection with the arm 7 for actuating the contacts 35 and 36. The contact 37 is connected by a conductor 41 to one side of the small DC generator 31, the opposite side of which is connected to the common or ground return of the welding circuit.

A description of the operation of the circuit will make the functioning of the controller as shown in Figure 1 clear. By reference to Figure 2, it will be seen that, normally, the direct current from the generator 31 is connected through the contacts 37 and 38, and the electro-magnet 2, contact 42 and electro-magnet 3, to the movable welding electrode E. When this is touched to the workpiece or ground member G and then withdrawn, an arc is started. Immediately, the heavy current which passes through the electro-magnet 2 and also through the electro-magnet 3 will draw the plungers 4 and 5, and likewise their respective arms 6 and 7, inwardly and will cause the rod 10 to act on the lever 15 to close the contacts 18 and 42, thereby switching alternating current from the welding transformer T across the welding electrodes. At the same time, the lever 39 will open the contacts 37 and 38, cutting off the direct current.

Actuation of the rod 10 and the arm 7 closes the contacts 35 and 36, and while some current passes through the electro-magnet 21, this is not enough to energize this magnet because the voltage delivered by the transformer to the electrodes is only on the order of twenty-five or thirty volts. However, if the arc should go out, as happens when the electrode is used up, or the operator stops welding, the voltage across the transformer rises to the normal open circuit voltage of about eighty, so that somewhere within the range of from fifty to eighty volts is applied to the electro-magnet 21, which will cause this magnet to act on its plunger 22, causing it to strike a sharp blow on the free end of the lever extension 23, which will "knock" open the controller and open the contacts 18 and 42, at the same time restoring the low voltage DC current to the welding handle and the workpiece or ground member G.

While the controller is usually equipped with a spring 43 to assist in opening the controller, I have found in practice that an arc is set up across the contacts 18 and 42 during the closing operation. This is due to the fact that when the electrode E is touched to the work G, a substantial short circuit is put across the welding transformer and a very heavy current flows for a very short interval of time, and it is this heavy current flowing through the contacts 18 and 42, on making the circuit, which tends to pit the contacts and freeze them together so that the spring 43 is not enough to open the controller at zero or near zero current.

By the arrangement shown, I have provided a positive "knock-out" for the controller and have entirely eliminated any possibility of an operator putting an electrode into the welding holder and getting even 80 volts, it being understood that the voltage in the DC generator 31 is approximately twenty-five or thirty volts, which is sufficient to easily start an arc.

While I have shown the coil of the electro-magnet 21 in operative relation to the arm 6, it may be mounted in operative relation to the arm 7 or a pair of "knock-out" coils may be used, if desired, but I have found that one is amply sufficient. It will be obvious that the type of or construction of the controller per se may vary over a wide range without departing from the principles of my invention.

What I claim is:

1. In an electrical circuit controller for a predestined arc welding circuit, apparatus having means for closing and opening the circuit, an electro-magnet for actuating at least a part of said means for automatically closing the circuit, another electro-magnet for automatically acting on at least a part of said means for holding the circuit closed, and another electro-magnet automatically brought into action by a substantial raise in voltage in the circuit acting on said means to forcibly act thereon for opening the circuit controller.

2. In an electrical circuit controller for a predestined arc welding circuit, electro-magnetically operative switch parts for automatically closing the circuit, other electro-magnetically operative switch parts for automatically holding the circuit closed, and further electro-magnetically operative parts automatically brought into action by a substantial raise in voltage in the circuit for moving the first two mentioned switch parts to open circuit position.

3. In an electrical circuit controller for a predestined arc welding circuit, electro-magnetically operative switch parts for closing the circuit, other electro-magnetically operative switch parts for holding the circuit closed, and further electro-magnetically operative parts for forcibly acting on at least one of the two first mentioned switch parts to move both switch parts to open circuit position at a predetermined time on the automatic rise of the voltage across the electro-magnet operating said further electro-magnetically operative parts.

4. In an electrical circuit controller for a predestined arc welding circuit having electro-magnetically controlled switch parts for automatically closing said electrical circuit, and an electro-magnetically operative means adapted to act on said switch parts at a predetermined time, dependent on the automatic but substantial rise of the voltage across the electro-magnet of said electro-magnetically operative means, to forcibly move said switch parts to open circuit position.

5. In an electrical circuit controller for a predestined arc welding circuit having electro-magnetically controlled switch parts for automatically closing said electrical circuit, and an electro-magnetically operative means brought into operative condition on the closing of said circuit and adapted to act on said switch parts when the current in the electrical circuit, closed by said switch parts, becomes zero or closely thereto, to forcibly move the switch parts to open circuit position.

6. In an automatic circuit controller for a predestined arc welding circuit having an electro-magnet for actuating parts for closing main circuit contacts at the controller, switch contacts in series with said electro-magnet, a second electro-magnet for holding the main circuit contacts closed while at the same time holding open the contacts in series with the first-mentioned electro-magnet, and a third electro-magnet having parts cooperative with means associated with at least the second electro-magnet for forcibly opening the said main contacts when the current in the holding coil approaches zero.

7. A circuit controller for a predestined arc welding circuit having main contacts in the circuit, an electro-magnet to be energized by direct current and operating parts of the controller for closing said main contacts and supplying the direct current to the circuit, a second electro-magnet initially energized by the direct current passing through the first-mentioned electro-magnet and directly after the main contacts are closed, then energized by alternating current for holding the main contacts closed and supplying the alternating current to the circuit in place of the direct current, and a third electro-magnet energized by the alternating current only sufficiently on diminution of the current in the main circuit to substantially zero to forcibly actuate parts of the controller to positively insure the opening of said main contacts.

8. A circuit controller for use in a system utilizing both direct current and alternating current and having means for automatically applying the direct current to the circuit and then transferring the alternating current to the circuit, and further means for positively removing the alternating current from the circuit should the current in the circuit go down to substantially zero.

9. A circuit controller operative by alternate applications of direct current and alternating current and having means for automatically applying the direct current to the circuit and then transferring the alternating current to the circuit, and further means for positively removing the alternating current from the circuit should the current go out, and placing the direct current back into the circuit for the next cycle of operation.

CLAUDE J. HOLSLAG.